(12) United States Patent
Henry et al.

(10) Patent No.: US 8,763,590 B2
(45) Date of Patent: Jul. 1, 2014

(54) METHOD AND APPARATUS FOR ENHANCING THE UTILIZATION OF FUEL IN AN INTERNAL COMBUSTION ENGINE

(75) Inventors: Zachary A. Henry, Corryton, TN (US); Ricky L. Gammons, Lafayette, TN (US)

(73) Assignee: Petrolfree, Inc., Corryton, TN (US)

( * ) Notice: Subject to any disclaimer, the term of this patent is extended or adjusted under 35 U.S.C. 154(b) by 0 days.

(21) Appl. No.: 13/278,954

(22) Filed: Oct. 21, 2011

(65) Prior Publication Data
US 2012/0037099 A1 Feb. 16, 2012

Related U.S. Application Data

(63) Continuation-in-part of application No. 12/245,143, filed on Oct. 3, 2008, now abandoned, which is a continuation-in-part of application No. 12/203,621, filed on Sep. 3, 2008, now Pat. No. 8,141,523.

(60) Provisional application No. 60/977,954, filed on Oct. 5, 2007.

(51) Int. Cl.
*F02B 51/00* (2006.01)

(52) U.S. Cl.
USPC ................................................ 123/536; 123/3

(58) Field of Classification Search
USPC ........... 123/1 A, 3, DIG. 12, 25 R, 25 E, 538, 123/536; 210/243; 429/418, 411
See application file for complete search history.

(56) References Cited

U.S. PATENT DOCUMENTS

| | | | | |
|---|---|---|---|---|
| 3,761,062 A | * | 9/1973 | King | 261/1 |
| 4,715,325 A | * | 12/1987 | Walker | 123/1 A |
| 5,176,809 A | * | 1/1993 | Simuni | 204/273 |
| 5,582,139 A | * | 12/1996 | Feuerman | 123/25 C |

* cited by examiner

*Primary Examiner* — Hung Q Nguyen
(74) *Attorney, Agent, or Firm* — Pitts & Lake, PC (57) ABSTRACT

A mixture of conventional gasoline and hydrogen-containing additive, such as ethanol, destined for use as a fuel for an internal combustion engine, is processed through a fuel generator interposed between a source of the fuel mixture and the internal combustion engine. Within the fuel generator, the mixture is subjected to electrolysis and then fed to the internal combustion engine, one objective being to more efficiently power the internal combustion engine. A method and apparatus is disclosed.

10 Claims, 5 Drawing Sheets

METHOD AND APPARATUS FOR ENHANCING THE UTILIZATION OF FUEL IN AN INTERNAL COMBUSTION ENGINE

CROSS-REFERENCE TO RELATED APPLICATIONS

This application claims the benefit of U.S. patent application Ser. No. 12/245,143, filed Oct. 3, 2008, which is a continuation-in-part patent application of U.S. patent application Ser. No. 12/203,621, filed Sep. 3, 2008, and which is based upon U.S. Provisional Patent Application Ser. No. 60/977,954, filed Oct. 5, 2007, the entirety of each such application being incorporated herein by reference.

FIELD OF INVENTION

This invention relates to methods and apparatus for generation and delivery of fuel to an internal combustion engine (sometimes referred herein as an "ICE").

BACKGROUND OF THE INVENTION

Control of the operation of ICEs is conventionally achieved employing control over the quantity of a stream of combustible gas(es) introduced to the engine by means, for example, of a carburetor, fuel injector, or other such device. In each instance, the concept involves feeding of a suitable mixture of air and a combustible fluid, such as for example, petroleum-based fluids (gasoline, diesel fuel, etc.), biofuels, hydrogen, and the like. In the present disclosure the term "petrol" is at times employed to include gasoline, diesel or other petroleum based fuels for ICEs. Alternatively, the prior art has also included the concept of employing electric motors in addition to, or in lieu of, ICEs. In the art, alternative fuel(s) are actively being sought which can reduce the adverse effects on the environment attributable to their use and/or which are less expensive than currently available fuels and/or whose sources are abundantly available and, preferably, renewable. Combinations of these fuels and other motor vehicle powering concepts have had only limited success for various reasons such as cost, effectiveness, availability, storage, delivery to consumers, etc.

One particular fuel proposed for powering ICEs is ethanol. In current practice, ethanol is mixed with gasoline, for example, in an effort to reduce the quantity of gasoline consumed by ICEs. Approximately ten percent ethanol mixed with conventional gasoline has been proposed and is in use in certain localities with automotive ICEs. It is generally noted that, because ethanol has less relative energy, the dilution of conventional gasoline with ethanol often results in reduced efficiency of engine performance as compared to the use of only gasoline as the engine fuel.

SUMMARY OF THE INVENTION

In accordance with one aspect of the present invention, a mixture of conventional petrol and a fuel enhancer, such as water, ethanol, or a combination thereof, destined for use as a fuel for an ICE, is processed through a fuel generator interposed between a source of the fuel mixture and the ICE. Within the fuel generator, the mixture is subjected to electrolysis, whereupon the fuel enhancer is separated into component substances useful as fuel in the ICE to form a modified fuel. The modified fuel is then fed to the ICE.

BRIEF DESCRIPTION OF THE DRAWINGS

The above-mentioned features of the invention will become more clearly understood from the following detailed description of the invention read together with the drawings in which.

DETAILED DESCRIPTION OF THE INVENTION

Figure 1:
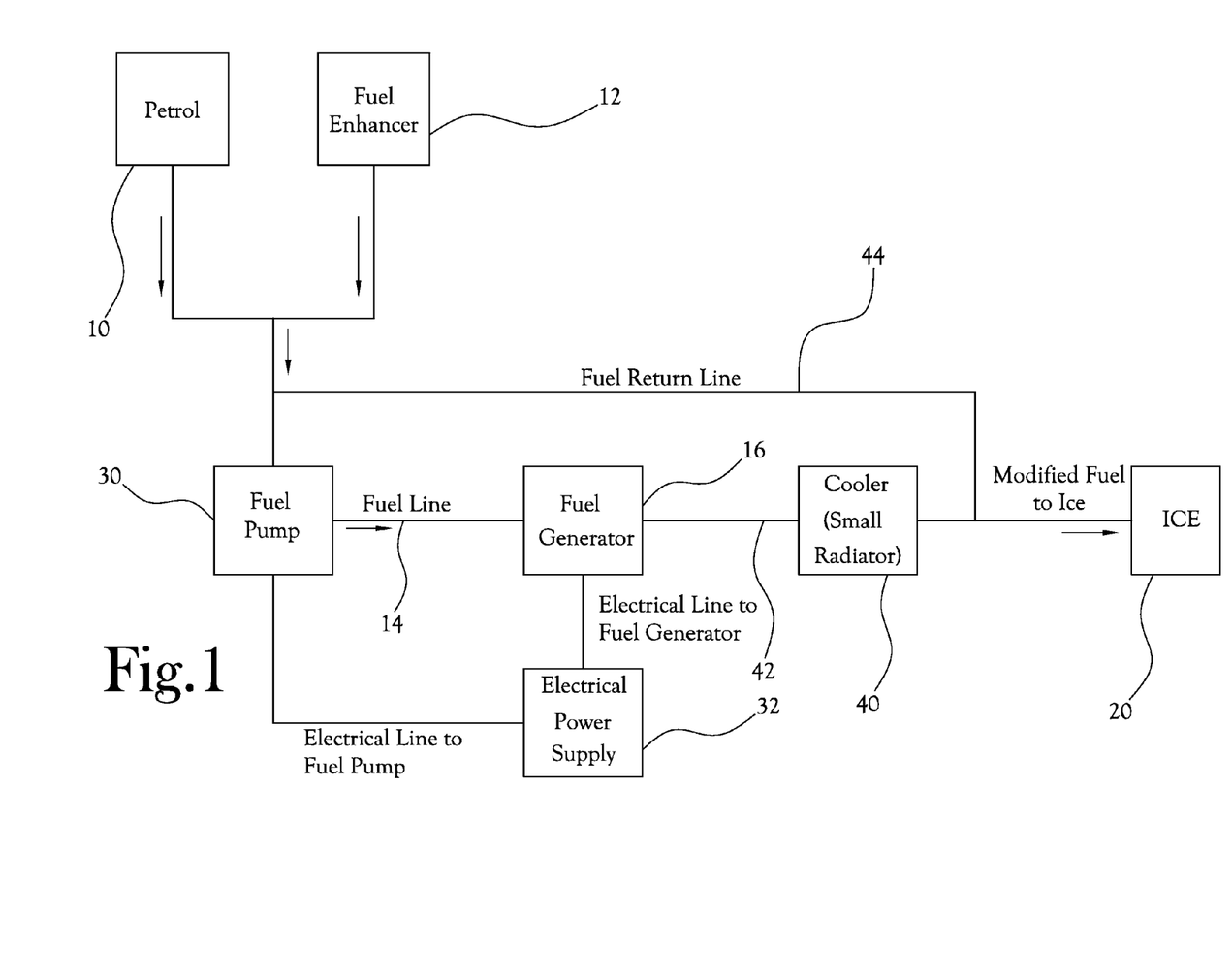
FIG. 1 is a schematic diagram depicting one embodiment of a system embodying various aspects of the present invention.

Referring to the several Figures, in FIG. 1 there is depicted one embodiment of a system of the present invention for processing a mixture of fuel and fuel enhancer, such as gasoline and ethanol, for example, through electrolysis and feeding the processed mixture to the existing fuel system of the ICE. As noted, the mixture employed may be one of the gasoline/ethanol mixtures (petrol) currently commercially available "at the pumps" where ICE fuel is offered for sale. One such mixture commonly is designated at the pumps as "E10 for 10% ethanol".

In the embodiment of the system of FIG. 1, a quantity of the petrol is stored in a first tank 10 and a quantity of fuel enhancer is stored in a second tank 12. The fuel enhancer is a fluid which, when subjected to the electrolysis of the system as described hereinbelow, chemically reacts to form components which are desirable in improving energy output of the fuel by the ICE. In certain embodiments, the fuel enhancer is a substance containing hydrogen, carbon, or a combination of the two, and in certain more discreet embodiments, the fuel enhancer is selected from the group consisting of water, ethanol, or a combination thereof. However, it will be understood that other substances may be used as the fuel enhancer without departing from the spirit and scope of the present invention.

The individually controlled discharges from the two tanks are fed into a common fuel line conduit 14 after moving through the fuel pump 30 and before flowing into the fuel generator 16 of the present invention. In one embodiment, the fuel pump 30 maintains the individually controlled discharges from the two tanks at a pressure sufficient to promote mixing of the fuel enhancer with the petrol prior to flowing into the fuel generator 16. Within the fuel generator 16, the mixture is subjected to electrolysis, whereupon at least a portion of the fuel enhancer is separated into the desirable components within the fuel to create a modified fuel, and such modified fuel from the fuel generator 16 is fed through a conduit 42 to a carburetor or fuel injection system of the ICE 20.

Power for operation of a fuel pump 30 and the fuel generator may be provided as by a conventional electrical power supply 32 (e.g. such as the common 12 volt DC automobile battery). The electrical power supply can be the same 12 volt, direct current battery often used to supply the electrical requirements for the ICE in an automotive engine. The electrical field may be produced by a direct current source or an alternating current source. In one embodiment, the DC output from the battery may be fed through an electrical inverter (not shown) to convert the DC current to AC current. In any event, the battery power is electrically connected to the fuel pump 30 and the fuel generator 16. As appropriate, conventional electrical controls and special systems for regulation and modification of the power supplied may be employed to each of the fuel pump 30 and the fuel generator 16. In the depicted embodiment, a cooler 40 (e.g., relatively small radiator) may be interposed for some applications that generate excessive heat along the length of the conduit 42 leading from the fuel generator to the carburetor/injection system for the ICE.

Figure 2:
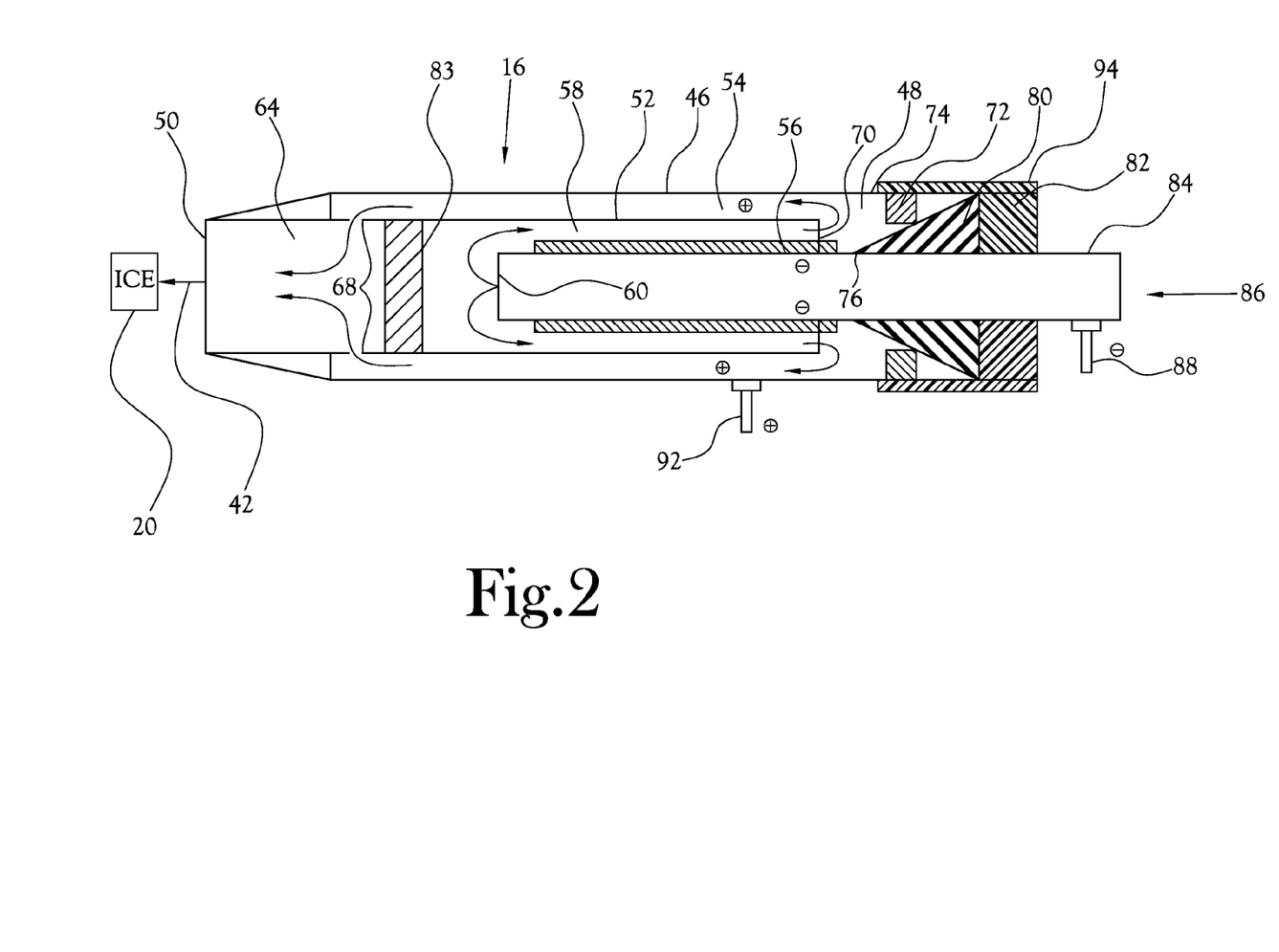
FIG. 2 is a diagrammatic sectional side view of one embodiment of an apparatus embodying various aspects of the present invention.

The schematically depicted fuel generator of FIG. 2 includes a positively charged, elongated cylindrical outer housing 46 (e.g., an electrically conductive metal pipe) having entrance and exit opposite ends 48 and 50 respectively. Concentrically within the outer housing there is provided an elongated cylindrical intermediate housing 52 (e.g., an electrically conductive metal pipe) which extends between the exit end 50 of the outer housing and a location proximate, but spaced apart from, the entrance end 48 of the outer housing, thereby defining therebetween a first elongated annular fluid flow chamber 54. Further, concentrically within the intermediate housing 52, there is provided an inner housing 56, (e.g., an electrically conductive metal pipe), having a diameter which is less than the diameter of the intermediate housing 52, so that there is defined a second elongated annular chamber 58 between the intermediate housing 52 and the inner housing 56 for fluid flow therethrough. The exit end of the intermediate housing 52 is electrically joined to the exit end 50 of the positively charged outer housing 46 thereby providing a positive electrical charge to the intermediate housing 52. The inner housing includes an exit end 60 which terminates proximate to, but spaced apart from a disc seal 83 which closes the intermediate housing 52 at a location between the exit end 60 of the inner housing and the exit end 50 of the outer housing. Within the space 64 between this disc seal and the exit end of the outer housing, the wall of the intermediate housing is perforated 68 for fluid flow from the first annular chamber 54 between the intermediate housing and the outer housing, thence out of the fuel generator through the exit end 50 of the outer housing.

The entrance end 48 of the outer housing outboard of the exit end 70 of the intermediate housing is sealed fluid tight. In the depicted embodiment, this closure of the outer housing is partially accomplished by welding, or similarly joining, the outer circumference of a washer 72 to the inner wall 74 of the outer housing at a location slightly inboard of the entrance end 48 of the outer housing. The washer 72 firstly functions to partially close the entrance end 48 of the outer housing 46 so that fluid flow from the second annular chamber 58 is diverted into the first annular chamber 54 defined between the outer housing 46 and the intermediate housing 52. Secondly, the washer 72 encircles the outer wall 76 of the inner housing 56 but leaves a space between the washer 72 and the outer wall 76 of the inner housing 56. Further sealing of the space between the washer 72 and the outer wall 76 of the inner housing 56 is by means of a compressible, electrically non-conductive conical bushing 80 which is captured between the washer 72 and a pressure ring 82 which may be threaded onto the outer wall 76 of the inner housing 56 and which is adapted to bear against the bushing 80 to effect fluid flow sealing of the space between the washer 72 and the outer wall 76 of the inner housing 56. As depicted in FIG. 2, the entrance end 84 of the inner housing 56 projects outboard of the fuel generator 16 to define an outboard infeed 86 to the fuel generator 16, along with a first electrode 88. Electrical connection of the outer housing may be through a second electrode 92.

Figure 5:
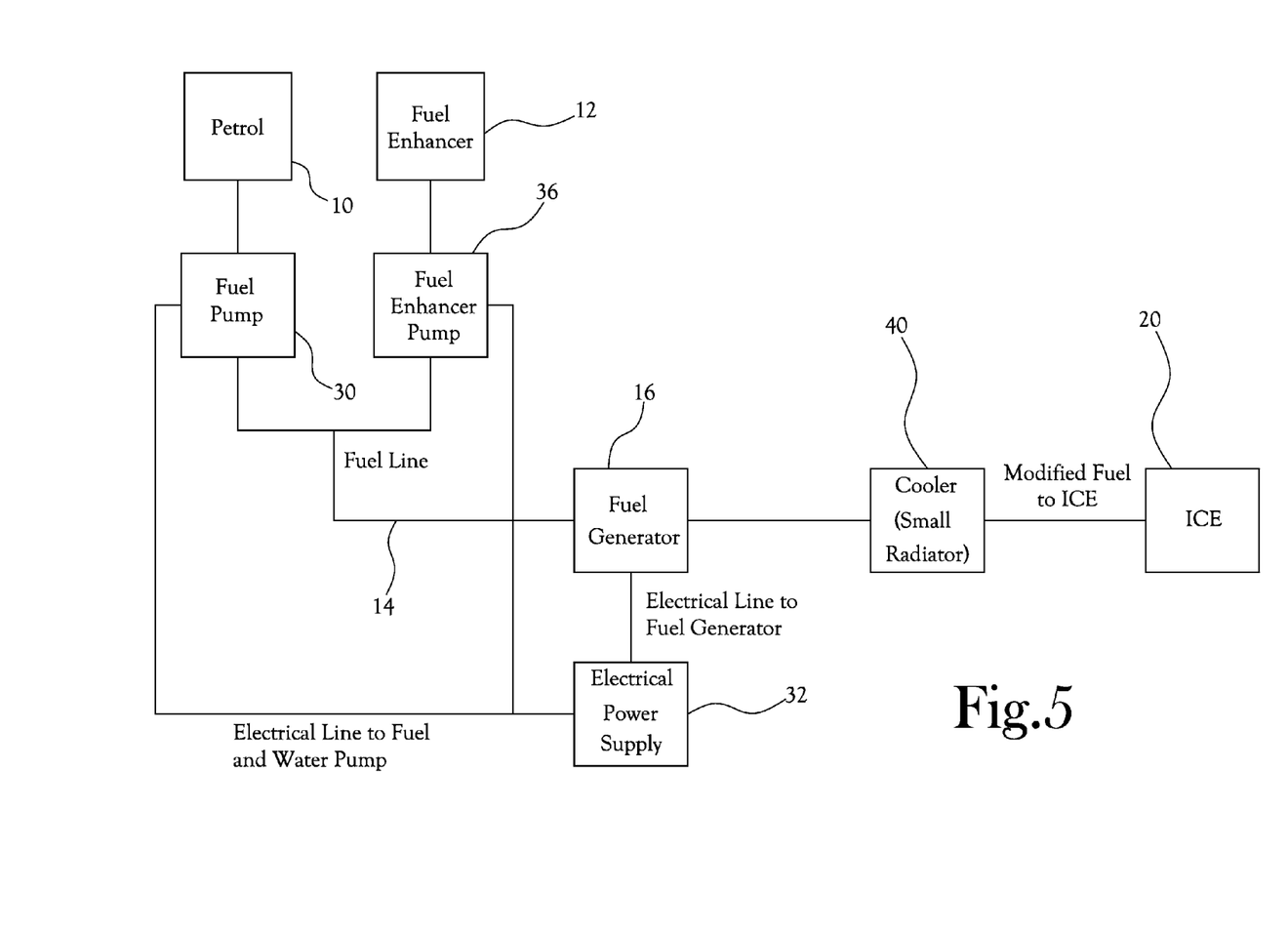
FIG. 5 is a schematic diagram depicting another embodiment of a system embodying various aspects of the present invention.

Referring again to FIG. 1, the petrol and the fuel enhancer are forced through the fuel line 14 and the fuel generator 16 with appropriate pumps or other energy source. In applications in which the ICE is installed in a motor vehicle, a fuel pump 30 for the petrol commonly is installed by the vehicle manufacturer. However, as shown in the embodiment of the present invention depicted in FIG. 5, a further pump 36 or other such device may be provided to force the fuel enhancer 12 (depicted as water in FIG. 5) into the fuel line immediately prior to introduction of the combined petrol/enhancer into the fuel generator 16. Referring to FIGS. 1 and 5, in several embodiments, the petrol is moved from the fuel tank 10 to the fuel generator 16 and then to the ICE 20 under pressure. In one embodiment, the fuel enhancer 12 is introduced into the petrol 10 at a pressure higher than that of the petrol in the fuel line 14 just before the combined petrol/enhancer moves into the fuel generator 16. In certain embodiments, turbulence from the introduction of the fuel enhancer to the petrol, and from the combined petrol/enhancer moving through the fuel generator 16, along with the action of the electric field of the fuel generator 16 promotes mixing of the petrol with the fuel enhancer. The desired result is a homogenous mixture. However, a completely homogenous mixture is not necessary to accomplish the system of the present invention.

Once introduced into the fuel generator 16, and with reference to FIG. 2, the combined petrol/enhancer flows into and through the inner housing 56, thence into and through the second annular chamber 58 defined between the negatively charged inner housing 56 and the intermediate housing 52. As the combined petrol/enhancer moves through the second annular chamber 58 defined between the negatively charged inner housing 56 and the positively charged intermediate housing 52, the combined petrol/enhancer is subjected to electrolysis by reason of the electrical charge imposed on the inner and intermediate housings.

Electrical power for the electrolysis can be either direct or alternating current. The system used in the test discussed employed the 12 volt battery required for the automobile and attached a 12 volt DC to 115 volt AC inverter as will be recognized by those skilled in the art. In the depicted embodiment, the 115 volt output of the inverter is used to power the electrolysis of the fuel generator.

The electric field within the fuel generator 16 serves to (1) polarize and separate molecules of the fuel enhancer into its component gases; and (2) decrease the surface tension on the total mixture of petrol and fuel enhancer so that an explosion of the modified fuel in the ICE will release more energy. Once subjected to electrolysis, at least a portion of the enhancer in the petrol/enhancer combination separates into component substances to form the modified fuel. For example, in one embodiment in which the fuel enhancer includes water, at least a portion of the water, and preferably substantially all of the water, separates into component hydrogen and oxygen gasses upon subjection to the electrolysis. Thereafter, the modified fuel exits the second annular chamber 58 at the entrance end 48 of the outer housing 46 and is then redirected into and through the first annular chamber 54 defined between the intermediate housing 52 and the outer housing 46, the outer housing being charged positively. Following this passage along the length of the fuel generator 16 through the first annular chamber 54, the modified fuel exits by way of an exit end 50 of the outer housing.

It will be understood that the electrolysis of the fuel enhancer within the combined petrol/enhancer mixture results from an electric field generated by the oppositely charged housings. The degree of effect of the electric field in electrolyzing the fuel enhancer, for any given mixture of petrol and enhancer, is dependent upon (1) the strength of the electric field (the voltage and the distance between the housings); and (2) the time the mixture remains between the charged housings. The time that the mixture remains in the electric field depends upon the rate the fuel is used by the internal combustion engine. Therefore, as desired, the fuel generator 16 may be provided with a return flow conduit 44 leading from the exit conduit 42 from the outer housing 46 to the conduit through which the initial mixture of petrol and fuel enhancer is fed to the fuel generator. The necessity for, and the position of the return flow conduit 44 is dependent upon the characteristics of the individual fuel flow/carburetion system with which the fuel generator 16 is used. For example, it will be understood that in certain applications, multiple subjections of the combined petrol/enhancer to electrolysis is desirable to produce a modified fuel having a desirable portion of the fuel enhancer separated into its component materials.

The amperage required is dependent, at least in part, on the conductivity of the combined petrol/enhancer mixture. For example, the conductivity of distilled water, as well as that of hydrocarbon fuel, is low. The conductivity of many petrol/enhancer mixtures is thus often dependent upon the conductivity of the fuel enhancer and the effect the enhancer has upon the petrol/enhancer mixture. The enhancer is most desirably, but not required to be a substance that will dissolve in water and will not be caustic or corrosive to the fuel generator 16 or the ICE. Furthermore, it will be understood that a higher voltage produces a stronger electric field. One method for increasing the voltage is to use a voltage inverter that changes direct current voltage to alternating voltage. For one system tested for use in an ICE in a motor vehicle, the power from a 12 volt direct current source was changed to approximately a 115 volt alternating current source. The system required an input current of 12 to 18 amperes. For the motor vehicle tested, the manufacturer-installed alternator was only marginally adequate. Therefore, in certain embodiments, a second battery is added in parallel, and in another embodiment, the size of the alternator associated with the ICE is increased.

Referring again to FIG. 2, the circumferential junction between the outer housing 46 and the pressure ring 82 encircling the projecting entrance end 84 of the inner housing 56 is sealed as by an electrically insulative pipe fitting 94 that is threaded to the outer housing 46. The fitting 94 surrounds and engages the pressure ring 82. The threaded fitting 94 is screwed onto the outer housing 46, thereby compressing the pressure ring 82 against the compressible, electrically non-conductive bushing 80 to exert pressure on both the washer 72 and the inner housing 56 to provide a fluid seal. By these means, the inner housing 56 is electrically insulated from the outer housing 46. In the illustrated embodiment, a degree of control of the electrolysis can be obtained by adjustment of the distance the infeed element 84 is allowed to protrude into the generator 16. This can be accomplished in the following way. When the pipe fitting 94 is tightened, the conical bushing 80 is pressed inward and sealed. When the fitting 94 is loosened, the pressure is removed from the conical bushing 80 and the position of the inner housing 56 along the generator 16 can then be adjusted. The seal can then be made again by tightening the non-conductive pipe fitting 94.

It will be understood that the structure of the fuel generator for moving the combined petrol/enhancer mixture through an electrolysis field can take many forms. However, the elongated concentric pipe construction depicted in FIG. 2 provides the advantages of (1) an economical and easy method of construction with commonly available materials; (2) easy adaptation of fittings to tie into the ICE fuel line; (3) allowance for maximizing the total distance of fluid flow between the charged housings with minimum space requirement and maximum electrolysis effect; (4) the shape and size makes it easy to fit into available spaces, for example, in an engine compartment of an automobile; (5) adaptability to any internal combustion engine without substantial modification of the existing fuel system; (6) ease of installation with a minimum of auxiliary components; and (7) minimal danger of explosion and negligible apparent effect on existing CPU or other like controls for the ICE.

Figure 3:
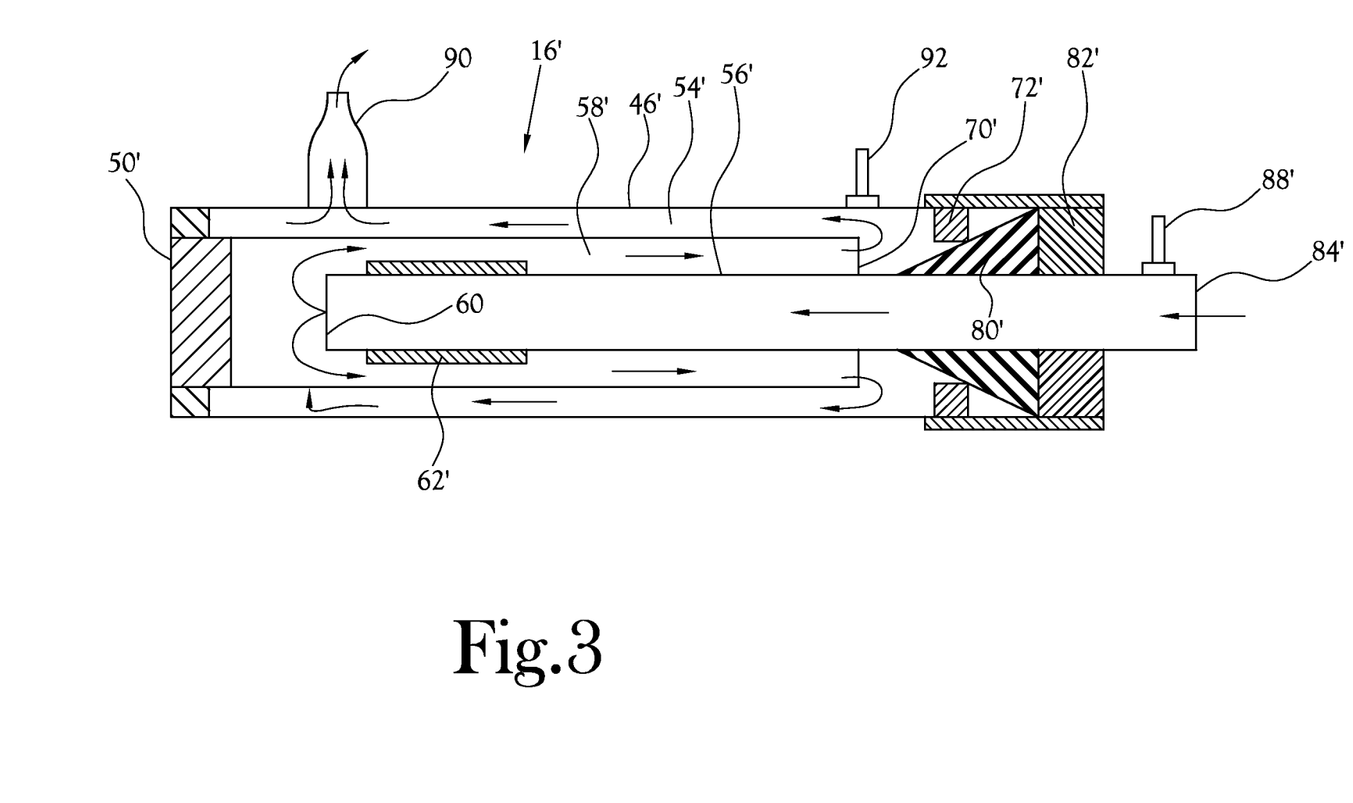
FIG. 3 is a diagrammatic sectional side view of a further embodiment of an apparatus embodying various aspects of the present invention.

It will be recognized that the embodiment of the present invention depicted in FIGS. 1 and 2 defines a type of electrolysis chamber wherein the inner housing functions as a first electrode and the outer housing functions as a second electrode. The intermediate housing functions to separate the annular space between the inner housing and the outer housing into the first and second annular chambers, thereby increasing the residence time of the flowing fuel mixture within the fuel generator. The incoming fuel mixture serves as an electrolyte and the fuel generator becomes an electrolysis unit that may be interposed between a source of a fuel mixture (electrolyte) and the modified fuel output from the fuel generator to the carburetor/fuel injection system of an ICE. In FIG. 3 there is depicted an embodiment of the fuel generator 16' which is substantially the same as the embodiment depicted in FIG. 2, except the embodiment of FIG. 3 employs an exit port 90 located on the side of the outer housing in lieu of having the modified fuel exit the fuel generator through an open end of the outer housing. Aside from the exit port aspect, the functioning of the system depicted in FIG. 3 is identical to the functioning of the system depicted in FIG. 2. Therefore, substantially all of the elements of the fuel generator 16' of FIG. 3 are identified with primed numerals taken from FIG. 2.

Figure 4:
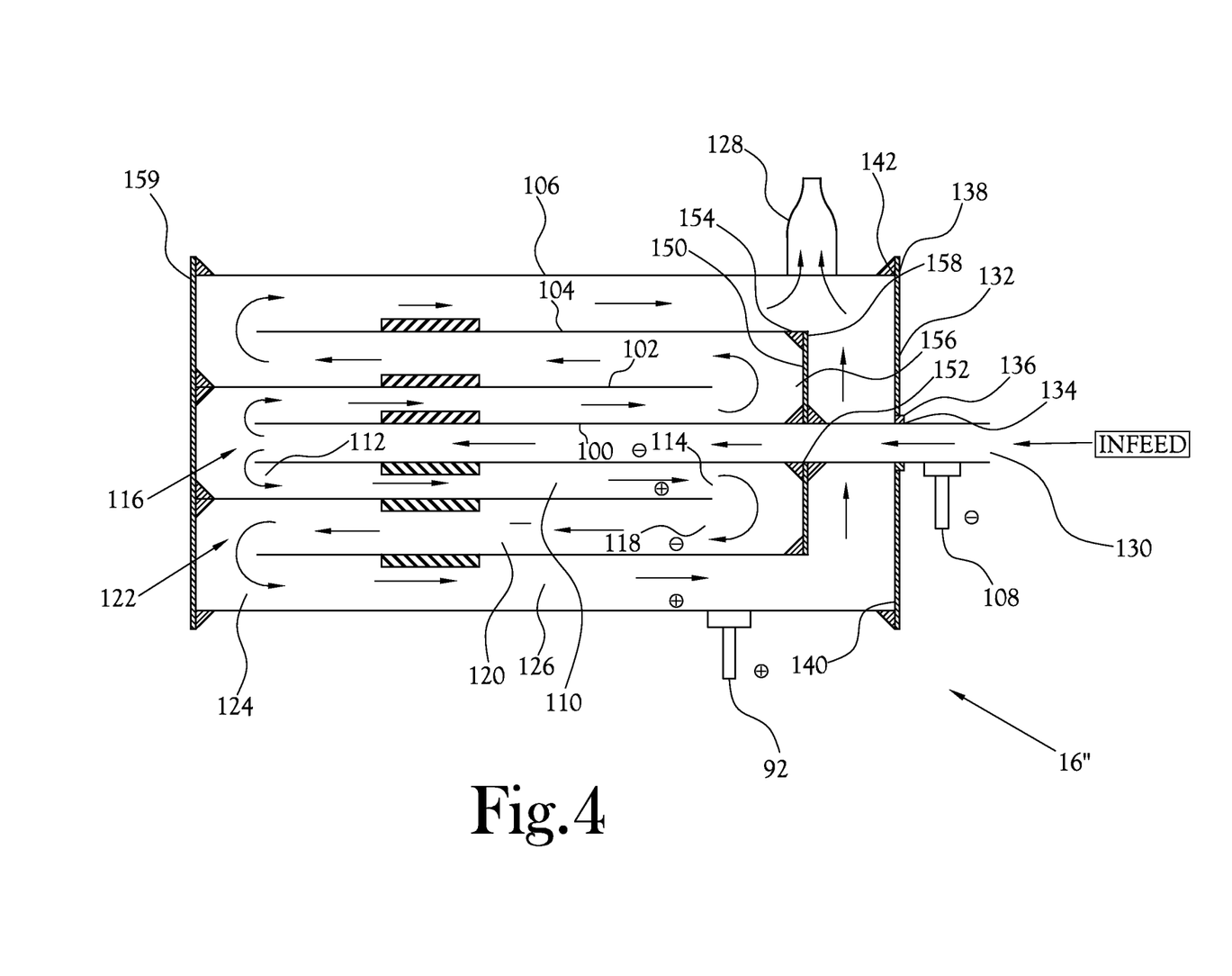
FIG. 4 is a diagrammatic side view of a still further embodiment of apparatus embodying various aspects of the present invention.

FIG. 4 depicts a further embodiment of the fuel generator 16". In this further embodiment, inner 100, first intermediate 102, second intermediate 104 and outer 106 cylindrical electrically-conductive housings (e.g., metal pipes) are mounted concentrically with one another to define the fuel generator 16". The inner housing 100 is central of the fuel generator 16" and serves as the infeed route for the introduction of combined petrol and fuel enhancer into the fuel generator (see arrows in FIG. 4). In the illustrated embodiment, this inner housing 100 is electrically negatively charged as by electrical current supplied through an electrode 108 affixed to the inner housing.

The inner housing 100, in combination with the first intermediate housing 102, defines a first annular fluid flow chamber 110 between these housings, such chamber having an entrance end 112 and an exit end 114. As seen in FIG. 4, combined petrol/enhancer flowing into and through the inner housing 100 is redirected from the exit end 116 of the inner housing into the entrance end of the first chamber 110, thence along the first chamber to the exit end of the first chamber where the fluid flow is redirected laterally of the fuel generator 16" and into the entrance end 118 of a second annular fluid flow chamber 120 defined between the first intermediate housing 102 and the second intermediate housing 104. At the exit end 122 of the second annular chamber 120, the fluid flow is redirected laterally and into the entrance end 124 of a third annular fluid flow chamber 126 defined between the second intermediate housing 104 and the outer housing 106. After passing through the multiple chambers 110, 120, 126, the fuel mixture exits the fuel generator through an exit port 128.

Notably, the entrance end 130 of the inner housing 100 passes through and is electrically insulated from a first conductive plate 132 which is oriented perpendicularly to the inner housing 100. The juncture 134 of the first conductive plate 132 and the inner housing 100 is sealed with an electrically insulative pressure seal 136 to preclude the escape of fuel mixture out of the fuel generator 16" at such juncture and to electrically isolate the plate 132 from the inner housing 100. The outer circumference 138 of the first plate 132 receives and is fixedly secured to the rim 142 of a first end 140 of the outer housing, thereby providing for mounting of such first end of the outer housing within the fuel generator 16". This joinder of the plate 132 and the rim 142 of the outer housing may be effected by welding techniques of the type known in the art.

Further, internally of the fuel generator 16", there is provided a second metal plate 150 which is mounted in a perpendicular attitude with respect to the inner housing 100, the inner housing passing through the center of the second plate 150. At the juncture 152 of the second plate 150 and the inner housing 100, the plate 150 is in electrical engagement with the inner housing 100 so that this plate is electrically charged with the same polarity as the inner housing 100. The rim 154 of the first end 156 of the second intermediate housing 104 is joined to the outer circumference 158 of the second plate 150 both for physical support of the second intermediate housing 104 within the fuel generator 16" and for providing for electrical connection of the plate 150 and the second intermediate housing 104 so that the second intermediate housing 104 is of the same electrical polarity (negative) as the inner housing 100.

As noted, internally of the fuel generator 16", the first intermediate housing 102 interposed between the inner housing 100 and the second intermediate housing 104 defines the first elongated annular fluid flow chamber 110 therein. In the depicted embodiment of FIG. 4, the entrance ends of the outer housing 106 and the first intermediate housing 102 are fixedly mounted within the fuel generator as by means of a third plate 159 which is oriented perpendicularly of the length of these housings. Specifically, the respective rims of the entrance end of each of the outer and second intermediate housings 106, 102 are welded to the third plate 159, thereby sealing these ends of these housings closed and providing support of these housings within the fuel generator 16". The third plate 159 is electrically conductive, thereby permitting a positive charge to be applied to each of the outer housing 106 and the first intermediate housing 102. Thus, when the several housings are assembled in their concentric array relative to one another, fuel mixture flowing into and through the fuel generator is exposed to three separate serially fluid-flow-connected chambers 110, 120, 126, each of which constitutes an electrolysis chamber. As seen in FIG. 4, after passing through these three chambers, the modified fuel exits the fuel generator through an exit port 128 and is fed to the carburetor/fuel injection system of an ICE. It is noted that the embodiment depicted in FIG. 4 may be expanded by providing additional cylindrical housings and defined chambers as required for desired modified fuel mixtures.

In each of the embodiments of the present invention as depicted in FIGS. 2 and 4, it has been found that subjecting the combined petrol/enhancer mixture to electrolytic treatment within the fuel generator increases the efficiency of utilization of the common petrol fuel available in the marketplace. Further, it has been found that adding a hydrogen-containing liquid, such as for example water, ethanol, or a combination thereof, to petrol and passing the mixture of petrol and hydrogen-containing liquid through the electrolysis treatment will significantly enhance the efficiency of the utilization of the petrol in an ICE. In the present invention, it has further been found that the fuel generator may be relatively small in physical size. For example the fuel generator may be about 24 inches in length and between about 2 and 6 inches in diameter, making the invention readily applicable to existing motor vehicles without major installation effort.

The depicted fuel generator of FIG. 4 is constructed to provide multiple electrified surfaces for enhanced electrolysis. This electrolysis may be affected by (1) the number of pairs of oppositely charged surfaces; (2) the distance between the oppositely charged surfaces; (3) the overall length of the generator; (4) the degree of insertion of the infeed element into a given length outer element; and (5) the electrical power supplied to power the electrolysis, and similar considerations.

In several embodiments of the system of the present invention, each of the electrolysis chambers is fabricated from cylindrical housings so arranged that the positive and negative housings fit concentrically within each other and are insulated from each other by electrically non-conducting bands 62' placed around the cylindrical housings. The bands have a thickness that is very slightly less than the distance between the cylindrical electrode elements, thus, preventing the positive and negative elements from making electrical contact while permitting the petrol/enhancer mixture to flow freely through the annular spaces between the concentric cylindrical electrically charged housings. The direction of electrical current flow may vary without departing from the spirit and scope of the present invention. For example, in the embodiments depicted in FIGS. 2-4, the inner housing is negatively electrically charged and the other housings are positively electrically charged. In other embodiments, the inner housing is positively electrically charged and the other housings are negatively electrically charged.

In accordance with one aspect of the present invention, one useful fuel mixture for feeding into the fuel generator comprises a mixture of gasoline (petrol) and an electrolysis enhancer e.g., a hydrogen-containing fluid, including ethanol and/or water. In the present invention, the water may be ordinary tap water, the electrolysis enhancer may be one or more of a large variety of hydrogen-based fluids such as ethanol, glycerin, and the like, which, along with other material, will enhance the electrolysis process and promote the emulsion of the mixture for the generation of hydrogen and other gases to increase the fuel efficiency.

The present inventors have found that by subjecting the petrol/enhancer mixture to electrolysis, the mixture is enriched with products resulting from the electrolysis which, in combination with the petrol, may be employed as the sole fuel for powering an ICE. For example, mixtures comprising about 50% petrol and about 50% water and catalyst have been found effective in reducing the quantity of petrol consumed by an ICE by as much as 50% or more.

In tests of the present invention, a fuel generator system of the present invention was installed in a 1995 Chevrolet Tahoe with a 5.7 liter ICE that, without a fuel generator, consistently travels at an average of approximately 10 miles to the gallon of petrol in town and 12 miles to the gallon of petrol on open roads. With a fuel generator of the embodiment depicted in FIG. 2 installed on this vehicle, and employing approximately 1 50-50% mixture of petrol and water/enhancer, this same ICE obtained 21 miles per gallon on the road.

Several factors that affect the electrolysis process include, but are not limited to, type of fuel enhancer used, fuel enhancer ratio, ratio of the amount of fuel enhancer to the amount of petrol, electric field (spacing of the plates (elements) and voltage across the plates) and amount of time the electrolyte (fluid) spends between the plates (rate of flow and length of the plates). There is an interaction among the factors that affect the electrolysis so that the change of one factor may cause the affect of another factor (or all of the other factors) to change. In several embodiments, the space between the plates and the length of the plates is fixed by the construction of the fuel generator. The fuel enhancer ratio may be changed in the preparation of the petrol/enhancer mixture. The ratio of the fuel enhancer to the amount of petrol may be changed by special pumps and valves. The voltage may be changed by a voltage divider. As these considerations are made, it must be understood that the greater the electrolysis, the greater the demand on the electrical power system. The relative effects of each of the above factors, individually and collectively may be employed to achieve optimum results with such optimum results being identified by the most efficient use of petrol by the ICE.

In a further test employing the same motor vehicle and fuel generator as discussed above, the above described ICE was provided with a source of only one-half gallon of petrol and an unlimited amount of water/catalyst mixture. The petrol was fully consumed at 21 miles of travel (42 miles per gallon). When this petrol was exhausted, by increasing the voltage on the electrodes and increasing the fuel pressure, sufficient amounts of combustible fuel enhancer components were generated (without petrol) to power the vehicle adequately an additional three miles to its "home", even though the power exerted by the ICE was below its normal operation.

In a given system of the present invention and the operation of such apparatus employing the method of the present invention, consideration is to be given to the sizing of the length and relative diameters of the elements of the apparatus, according to the desired amount of modified fuel required for a given ICE. Also, the amount of electrolysis depends upon the dimension of the elements, the adjustment of the elements with respect to each other, the amount of electricity applied to the electrodes and the regulated pressure from the fuel pump, all as will be recognized by one skilled in the art. As noted hereinabove, with a specific combination of petrol and fuel enhancer along with an identified fuel pressure, a motor vehicle having a fuel generator of the present invention installed therein can approximately double the miles per gallon of petrol consumed by the ICE in question.

The fuel generator 16 has also been employed to use fuel directly from a retail pump with 90% gasoline (petrol) and 10% ethanol (fuel enhancer) without the addition of water. In this case, the original gasoline-ethanol mixture was taken directly from the fuel tank for the ICE and moved directly through the fuel generator to the ICE. Several specific tests have given mileage improvement of 33% to 50%.

Multiple tests of the fuel generator, over an extended period, were conducted with a 1994 Mercury Marquis with a 4.6 liter engine that normally gets 20 miles per gallon. All tests were conducted with gasoline identified as "not more than 10% ethanol" directly from the retailer pump. Variation in these results were expected due to inaccurate measurement of the exact amount of ethanol mixed with the gasoline.

The results of these tests are given in the following Tables A and B:

TABLE A

Tests with water added to gasoline:

(1) A test of 51 miles that used 1.6 gallons of gasoline for 32 miles per gallon.
(2) A test of 101 miles that used 1.66 gallons of gasoline for 61 miles per gallon.
(3) A test of 163 miles that used 5.02 gallons of gasoline for 32.5 miles per gallon.
(4) A test of 48.3 miles that used 1.157 gallons of gasoline for 41.7 miles per gallon.

TABLE B

Tests with "not less than 10% ethanol" gasoline with no water added:

(1) A test of 150 miles in which the automobile got 28 miles per gallon.
(2) A test of 180 miles in which the automobile got 30 miles per gallon.
(3) A test of 73 miles that used 2.7 gallons of gasoline for 27 miles per gallon.
(4) A test of 410 miles that used 14.3 gallons of gasoline for 29 miles per gallons.
(5) A test of 168 miles that used 5.8 gallons of gasoline for 29 miles per gallon.
(6) A test of 450 miles that used 17.1 gallons of gasoline for 26.3 miles per gallon.
(7) A test of 271 miles that used 10.3 gallons of gasoline for 26.3 miles per gallon.
(8) A test of 206 miles that used 7.45 gallons of gasoline for 27.7 miles per gallon.
(9) A test of 165 miles that used 5.85 gallons of gasoline for 28.2 miles per gallon.

While the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

What is claimed is:

1. A method for enhancing the efficiency of combustion of a liquid fuel for an internal combustion engine comprising the steps of:
    a) interposing a fuel generator between a source of liquid fuel and the location of a fuel infeed to the internal combustion engine, the fuel generator being configured to subject the liquid fuel to an electrolysis field;
    b) feeding a liquid fuel comprising liquid petrol and a liquid fuel enhancer from the source to and through the fuel generator;
    c) in the fuel generator, creating a modified liquid fuel by subjecting the liquid fuel enhancer to the electrolysis field, thereby separating the liquid fuel enhancer into constituent components entrained in the modified liquid fuel, the constituent components including at least one combustible fluid; and
    d) feeding the modified liquid fuel including the liquid petrol and the at least one combustible fluid to the fuel infeed of the internal combustion engine.

2. The method of claim 1, said step of feeding a liquid fuel comprising liquid petrol and a liquid fuel enhancer from the source to and through the fuel generator further including the steps of:
    a) introducing a measure of liquid fuel enhancer to a measure of liquid petrol; and
    b) mixing the liquid petrol and the liquid fuel enhancer prior to feeding the liquid fuel through said fuel generator.

3. The method of claim 1 wherein the petrol comprises gasoline.

4. The method of claim 1 wherein the fuel enhancer is selected from the group consisting of water, ethanol, and a combination thereof.

5. The method of claim 4 wherein the fuel enhancer comprises ethanol present within the liquid fuel in an amount approximating 10% by volume of liquid fuel.

6. The method of claim 1 and including the step of: providing a regulated source of electrical power to the fuel generator, the electrical power being sufficient to generate the electrolysis field within the fuel generator.

7. The method of claim 1 further including the step of optimizing electrolysis of the fuel enhancer within the fuel generator by regulating the duration of exposure of the fuel enhancer to the electrolysis field within the fuel generator.

8. The method of claim 1 wherein the fuel passing through the fuel generator is directed along a tortuous path.

9. The method of claim 8 wherein said fuel enhancer comprises water present in said liquid fuel in an amount of less than about 50% by volume of liquid fuel.

10. The method of claim 1 wherein the fuel generator defines a pattern of elongated reverse flow paths of the liquid fuel passing through the fuel generator.

* * * * *